US010544302B2

(12) United States Patent
Varela Rizo et al.

(10) Patent No.: US 10,544,302 B2
(45) Date of Patent: Jan. 28, 2020

(54) POLYCARBONATE AND LIQUID CRYSTAL POLYMER BLENDS

(71) Applicant: SABIC Global Technologies B.V., Bergen op Zoom (NL)

(72) Inventors: Helena Varela Rizo, Alicante (ES); Ignacio Vic Fernandez, Santo Angel Murcia (ES); David Del Agua Hernandez, Murcia (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 137 days.

(21) Appl. No.: 15/553,196

(22) PCT Filed: Feb. 25, 2016

(86) PCT No.: PCT/IB2016/051040
§ 371 (c)(1),
(2) Date: Aug. 24, 2017

(87) PCT Pub. No.: WO2016/135671
PCT Pub. Date: Sep. 1, 2016

(65) Prior Publication Data
US 2018/0030266 A1  Feb. 1, 2018

(30) Foreign Application Priority Data

Feb. 26, 2015 (EP) .................. 15382081

(51) Int. Cl.
C08G 63/64 (2006.01)
C08G 81/00 (2006.01)
C08L 69/00 (2006.01)
C08L 77/10 (2006.01)
C08L 77/12 (2006.01)
C09K 19/38 (2006.01)
C09K 19/54 (2006.01)

(52) U.S. Cl.
CPC .............. C08L 69/00 (2013.01); C08G 63/64 (2013.01); C08G 81/00 (2013.01); C08L 69/005 (2013.01); C08L 77/10 (2013.01); C08L 77/12 (2013.01); C09K 19/3809 (2013.01); C09K 19/542 (2013.01); C08L 2201/10 (2013.01); C08L 2203/20 (2013.01); C08L 2205/12 (2013.01)

(58) Field of Classification Search
CPC .......... C08G 81/00; C08G 63/64; C08L 69/00; C08L 69/005; C08L 77/12; C08L 77/10; C08L 2201/10; C08L 2203/20; C08L 2205/12; C09K 19/542; C09K 19/3809
See application file for complete search history.

(56) References Cited

U.S. PATENT DOCUMENTS

| 4,256,821 A * | 3/1981 | Enomoto ............. G03G 5/0683 430/58.45 |
| 5,262,473 A | 11/1993 | Cottis et al. |
| 6,174,944 B1 * | 1/2001 | Chiba ..................... C08L 69/00 524/127 |
| 6,956,072 B1 | 10/2005 | Kanaka |

FOREIGN PATENT DOCUMENTS

| EP | 0605157 A2 | 7/1994 |
| EP | 0943409 A1 | 9/1999 |
| EP | 2692767 A1 | 2/2014 |
| KR | 10-2007-0071592 | 7/2007 |
| KR | 1020070071592 | 7/2007 |
| WO | 2005061621 A1 | 7/2005 |

OTHER PUBLICATIONS

Troev, K. D., "Polyphosphoesters Chemistry and Application", Elsevier Insights, 2012, p. 17.*
Wei et al., The role of transesterification on the miscibility in blends of polycarbonate and liquid crystalline copolyester. Macromolecules 1997, 30, 1587.
Yi, et al., Study on the miscibility and rheological properties of thermotropic liquid crystalline polymers in thermoplastic matrices. Polymer Int. 1996, 39, 11.
Tovar, et al., Transesterification, morphology and some mechanical properties of thermotropic liquid crystal polymers/polycarbonate blends. Colloids and Surfaces A 2000, 161, 213.
Singapore Patent Application No. 11201706993U; Written Opinion; dated Dec. 14, 2017; 6 pages.

* cited by examiner

Primary Examiner — Patrick D Niland
(74) Attorney, Agent, or Firm — Cantor Colburn LLP

(57) ABSTRACT

The disclosure concerns a polymer blend derived from transesterification of (i) 69.9 to 95 weight percent polycarbonate; and (ii) 4.9 to 30 weight percent liquid crystal polymer; in the presence of 0.01 to 0.1 weight percent catalyst; wherein the polymer is transparent.

15 Claims, No Drawings

POLYCARBONATE AND LIQUID CRYSTAL POLYMER BLENDS

CROSS-REFERENCE TO RELATED APPLICATIONS

This application is the National Stage of International Application No. PCT/IB2016/051040, filed Feb. 25, 2016, which claims the benefit of U.S. Provisional application Ser. No. 15/382,081.6, filed Feb. 26, 2015, the disclosures of which are incorporated herein by reference in their entireties.

RELATED APPLICATIONS

This application claims benefit of European Patent Application No. 15382081.6 filed Feb. 26, 2015, the description of which is incorporated herein in its entirety.

TECHNICAL FIELD

The disclosure concerns transesterification of polycarbonate and liquid crystal polymer to form a polymer blend.

BACKGROUND

Polymer blending is a method to achieve new materials with different properties. Polycarbonate (PC) is an excellent engineering thermoplastic polymer because of its good impact strength, transparency and electrical properties. Liquid crystalline polymers (LCP) have excellent mechanical properties and have been used for in-situ reinforcement in some matrices. Blending polycarbonate with LCP, however, has been problematic. PC and LCP are immiscible and have different refraction indexes which cause blends to be opaque. There is a need in the art for a polycarbonate product that has improved mechanical properties provided by LCP while maintaining transparency.

SUMMARY

The disclosure concerns transparent polymer blends comprising polymer derived from transesterification of (i) 69.9 to 95 weight percent polycarbonate; and (ii) 4.9 to 30 weight percent liquid crystal polymer; in the presence of 0.01 to 0.1 weight percent catalyst.

The disclosure also concerns methods forming a transparent polymer blend comprising transesterification of (i) 69.9 to 95 weight percent polycarbonate; and (ii) 4.9 to 30 weight percent liquid crystal polymer; in the presence of 0.01 to 0.1 weight percent catalyst.

DETAILED DESCRIPTION OF ILLUSTRATIVE EMBODIMENTS

The present invention provides for a transparent blend of polycarbonate and liquid crystal polymers. Achieving transparency from a combination of polymers that would not normally be transparent is achieved by transesterification of (i) 69.9 to 95 weight percent polycarbonate; and (ii) 4.9 to 30 weight percent liquid crystal polymer; in the presence of 0.01 to 0.1 weight percent catalyst.

Polycarbonate Polymer

The terms "polycarbonate" or "polycarbonates" as used herein includes copolycarbonates, homopolycarbonates and (co)polyester carbonates.

The term polycarbonate can be further defined as compositions have repeating structural units of the formula (1):

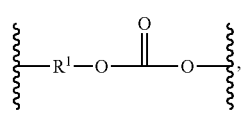

in which at least 60 percent of the total number of R' groups are aromatic organic radicals and the balance thereof are aliphatic, alicyclic, or aromatic radicals. In a further aspect, each R1 is an aromatic organic radical and, more preferably, a radical of the formula (2):

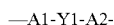

wherein each of A1 and A2 is a monocyclic divalent aryl radical and Y1 is a bridging radical having one or two atoms that separate A1 from A2. In various aspects, one atom separates A1 from A2. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical Y1 is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of the same.

It is preferred that the polycarbonate is substantially free of halogen atoms. By "substantially free" it is intended that less than 0.1 wt % of the polycarbonate comprises halogen atoms.

In some embodiments a melt polycarbonate product may be utilized. The melt polycarbonate process is based on continuous reaction of a dihydroxy compound and a carbonate source in a molten stage. The reaction can occur in a series of reactors where the combined effect of catalyst, temperature, vacuum, and agitation allows for monomer reaction and removal of reaction by-products to displace the reaction equilibrium and effect polymer chain growth. A common polycarbonate made in melt polymerization reactions is derived from bisphenol A (BPA) via reaction with diphenyl carbonate (DPC). This reaction can be catalyzed by, for example, tetra methyl ammonium hydroxide (TMAOH) or tetrabutyl phosphonium acetate (TBPA), which can be added in to a monomer mixture prior to being introduced to a first polymerization unit and sodium hydroxide (NaOH), which can be added to the first reactor or upstream of the first reactor and after a monomer mixer.

A polycarbonate according to the present disclosure may (but this is not a requirement) comprise less than or equal to 33 parts per billion by weight (ppb), specifically less than or equal to 20 ppb of molybdenum; less than or equal to 33 ppb, specifically less than or equal to 20 ppb vanadium; less than or equal to 33 ppb, specifically less than or equal to 20 ppb chromium; less than or equal to 75 ppb, specifically less than or equal to 50 ppb titanium; less than or equal to 375 ppb, specifically less than or equal to 250 ppb of niobium; less than or equal to 33 ppb, specifically less than or equal to 20 ppb of nickel; less than or equal to 10 ppb, specifically less than or equal to 5 ppb zirconium; less than or equal to 10 ppb, specifically less than or equal to 5 ppb of iron. Further details are found in European applications 13382087.8 and 13382085.2, both of which applications are incorporated herein by reference in their entireties for any and all purposes. Without being bound to any particular theory, the foregoing purity levels of the diaryl carbonate or the polycarbonate may influence the transparency, color, or both of the polycarbonate product.

Liquid Crystal Polymer

The term "liquid crystal polymer" (LCP), as used herein, is meant to include polymer alloys having a liquid crystal polymer component as well as liquid crystal polymers alone. Liquid crystal polymers are generally known to mean a polymer whose molecules are in a fluid and ordered state over a range of temperatures intermediate between those which correspond to the solid state and those which correspond to the completely disordered melt (thermotropic polymer) or else a polymer capable of existing in the ordered state in solution.

Some examples of LCPs are detailed in "Encyclopedia of Polymer Science and Engineering", published by John Wiley & Sons, New York, 1987, Vol. 9, pages 1 to 61 and, in particular, the polyesters in Table 12 (pages 50 and 51) and Table 13 (page 52).

In some embodiments, the liquid crystal polymer is an aromatic polyester resin or an aromatic polyester amide resin. Some aromatic polyester resin and aromatic polyester amide resin and method for forming same are disclosed in European Patent Nos. 0191705 and 0272992, and U.S. Pat. Nos. 4,161,470 and 4,330,457, the disclosures of which are incorporated herein by reference.

Some preferred liquid crystal polymers comprise an aromatic polyester, aromatic polyesteramide or aramid polymer character.

Some preferred LCP polymers are p-hydroxybenzoic acid/6-hydroxy-2-naphthoic acid copolyesters and p-hydroxybenzoic acid/terephthalic acid/4,4'-biphenol copolyesters which are commercially available, for example the copolyesters of trademark VECTRA™ (Celanese Corporation) and XYDAR™ (Solvay).

One suitable liquid crystal polymer is VECTRA® A950 marketed by Celanese Corporation. This polymer has a tensile modulus (1 mm/min) of 10,600 MPa measured according to ISO 527-2/1A, a flexural modulus (23° C.) of 9100 MPa measured by ISO 178 and a notched impact strength (IZOD) (23° C.) of 95 kJ/m$^2$ measured according to ISO 180/1A. The polymer has a melting temperature of 280° C.

Catalyst

Any suitable transesterification catalyst may be used with the invention. Some preferred catalysts are transition metal containing transesterification catalysts. Transition metals include Zn, Ce, Ti, Sn, Al, Co, Sb, and Pb.

Other preferred catalysts are those derived from an alkali metal-based compound, or an alkaline earth metal. Examples of the alkali metal-based compounds are sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogenphosphate, dipotassium hydrogenphosphate, dilithium hydrogenphosphate, sodium phenylate, potassium phenylate, lithium phenylate, sodium borohydride, potassium borohydride, and lithium borohydride. In practice, the alkali metal-based compound initially reacts in the melt with the aromatic dihydroxy compound to form an alkali metal salt. Thus, the active catalyst is actually an alkali metal salt of the aromatic dihydroxy compound, e.g., the sodium salt of bisphenol A. Moreover, salts of the dihydroxy compounds (prepared beforehand) may also be used, e.g., the disodium-, dipotassium-, or dilithium salts of bisphenol A.

Examples of the alkaline earth metal compounds are calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

In some embodiments, sodium stearate or catalysts containing Zn, Ce or Sn are preferred. In some embodiments, zinc acetate (II) is a preferred catalyst While any amount of catalyst that accomplishes forming a transparent product may be used, in some embodiments, the amount of catalyst is 0.01 to 0.1 weight percent of the polymer blend. In some embodiments, the amount of catalyst is 0.01 to 0.04 weight percent of the polymer blend.

Additional Components

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The polymer blends can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition. The additives may be added during the melt extrusion provided the additives do not inhibit or significantly affect the efficiency of the desired reaction as catalyzed by the catalyst. The additives may also be added in a second melt mixing step.

Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like. Some suitable impact modifies include PC (polycarbonate)/ABS (such as Cycoloy PC/ABS) and MBS type formulations.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g, dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl)phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g, octyl-4,5-epoxy-hexahydrophthalate), tris-(octoxycarbonylethyl) isocyanurate, tristearin, di- or polyfunctional aromatic phosphates (e.g, resorcinol tetraphenyl diphosphate (RDP), the bis(diphenyl)phosphate of hydroquinone and the bis(diphenyl)phosphate of bisphenol A); poly-alpha-olefins; epoxidized soybean oil; silicones, including silicone oils (e.g., poly(dimethyl diphenyl siloxanes); esters, for example, fatty acid esters (e.g, alkyl stearyl esters, such as, methyl stearate, stearyl stearate, and the like), waxes (e.g, beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphe-nyObenzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly (vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers are used in amounts of 1 to 200 parts by weight, based on 100 parts by weight of based on 100 parts by weight of the total composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

Polycarbonates can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized.

Polymer Composition

Compatibilization of polycarbonate—liquid crystal polymer blends to decrease the size of the dispersed phase (LCP in this case) and achieve a transparent blend. Due to the nature of the two involved polymers (presence of carbonate, OH groups and ester bonds), they can be compatibilized through different chemical reactions like alcoholysis by OH end group, acidolysis by acid end group or transesterification (which occurs with higher probability in polymers with high Mw). These reactions can happen at high temperature (above 200° C.) or can be forced with the aid of catalysts.

Some transparent polymer are derived from transesterification of (i) 69.9 to 95 weight percent polycarbonate; and (ii) 4.9 to 30 weight percent liquid crystal polymer; in the presence of 0.01 to 0.1 weight percent catalyst;

Certain compositions comprise polymer obtained from transesterification of 84.9 to 95 weight percent polycarbonate and 4.9 to 15 weight percent liquid crystal polymer The polymer compositions may additionally contain additives as described herein.

The polymer compositions can be formed by techniques known to those skilled in the art. Extrusion and mixing techniques, for example, may be utilized to combine the components of the polymer composition.

Some processes use reactive blending in extruder under conditions such as rpm (50-300), temperature: (200-300° C.) with a short mixing time (<5 min). The process can also comprise feeding the product at any intermediate stage in the polymerization process through side extruder with a longer mixing time.

Articles of Manufacture

In one aspect, the present invention pertains to shaped, formed, or molded articles comprising polymer blends described herein. The compositions can be molded into useful shaped articles by a variety of means such as injection molding, extrusion, rotational molding, blow molding and thermoforming to form articles. The compositions described herein can also be made into film and sheet as well as components of laminate systems. In a further aspect, a method of manufacturing an article comprises melt blending the polycarbonate component, the liquid polymer, catalyst and any optional ingredients; and molding the extruded composition into an article. In a still further aspect, the extruding is done with a twin-screw extruder.

In a further aspect, the article comprising the disclosed polymer blends is used in automotive applications. In a still further aspect, the article can be selected from computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. Other representative articles that may be fabricated using the disclosed copolymer compositions provided herein include headlamp bezels, headlamps, tail lamps, tail lamp housings, tail lamp bezels, license plate enclosures, enclosures for electrical and telecommunication devices, building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; and like applications. In a still further aspect, the article used in automotive applications is selected from instrument panels, overhead consoles, interior trim, center consoles, headlamp bezels, headlamps, tail lamps, tail lamp housings, tail lamp bezels, license plate enclosures, steering wheels, radio speaker grilles, mirror housings, grille opening reinforcements, steps, hatch covers, knobs, buttons, and levers. Additional fabrication operations may be performed on articles, such as, but not limited to molding, in-mold decoration, baking in a paint oven, lamination, and/or thermoforming.

In various aspects, the article comprising the disclosed polymer blends are suitable for use in applications such as transparent keypads for mobile phones. Other typical such articles are automotive trim, automotive interior parts, portable telecommunications and appliance fronts. In a further aspect, wherein the article is a film, it can further comprise visual effects pigments (such as coated Al and glass flakes). In a still further aspect, the article is a film comprising a disclosed copolymer composition can be used in direct film applications but also in processes like IMD (In Mould Decoration). In an even further aspect, the article comprising a disclosed copolymer composition is used in lighting applications including automotive headlamp lenses, covers and lenses for other optical devices, as well as transparent films and sheets. The article can also be used in a wide variety of molded products such as medical devices, radio and TV bezels, mobile phone keypads, notebook computer housings and keys, optical display films, automotive parts, and other electronic and consumer products.

In some preferred embodiments, polymers described herein are suited for use in electronic devices, for the production of thin-walled parts, like housings for cell phones and for automotive applications.

Aspects

The present disclosure comprises at least the following aspects.

Aspect 1. A transparent polymer blend comprising a polymer derived from transesterification of (i) 69.9 to 95 weight percent polycarbonate; and (ii) 4.9 to 30 weight percent liquid crystal polymer; in the presence of 0.01 to 0.1 weight percent catalyst; wherein said polymer is transparent; and wherein the combined weight percent value of all components does not exceed 100 wt. %, and wherein all weight percent values are based on the total weight of the transparent polymer blend.

Aspect 2. The transparent polymer blend of aspect 1, comprising 84.9 to 95 weight percent polycarbonate and 4.9 to 15 weight percent liquid crystal polymer.

Aspect 3. The transparent polymer blend of aspect 1 or 2, having a transmittance of at least 70% measured in accordance with ASTM D1003.

Aspect 4. The transparent polymer blend of any one of aspects 1-3, wherein the liquid crystal polymer comprises an aromatic polyester, aromatic polyesteramide or aramid polymer.

Aspect 5. The transparent polymer blend of any one of aspects 1-4, wherein the liquid crystal polymer comprises at least one of (i) p-hydroxybenzoic acid/6-hydroxy-2-naphthoic acid copolyesters and (ii) p-hydroxybenzoic acid/terephthalic acid/4,4'-biphenol copolyesters.

Aspect 6. The transparent polymer blend of any one of aspects 1-4, wherein the liquid crystal polymer comprises 2-naphthalenecarboxylic acid, 6-(acetyloxy)-polymer with 4-(acetyloxy)benzoic acid.

Aspect 7. The transparent polymer blend of any one of aspects 1-6, wherein the liquid crystal polymer is unfilled.

Aspect 8. The transparent polymer blend of any one of aspects 1-7, wherein the polycarbonate comprises residues of bisphenol A.

Aspect 9. The transparent polymer blend of any one of claims 1-8, wherein the polycarbonate comprises less than or equal to 33 ppb of molybdenum; less than or equal to 33 ppb of vanadium; less than or equal to 33 ppb of chromium; less than or equal to 75 ppb of titanium; less than or equal to 375 ppb of niobium; less than or equal to 33 ppb of nickel; less than or equal to 10 ppb of zirconium; less than or equal to 10 ppb iron; or any combination of the foregoing.

Aspect 10. The transparent polymer blend of any one of aspects 1-9, wherein the polymer additionally comprises one or more additives selected from anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer.

Aspect 11. The transparent polymer blend of any one of aspects 1-10, wherein the article is a component in a portable electronic device or an automobile.

Aspect 12. A method of forming a polymer blend comprising: (a) transesterifying a mixture of (i) 69.9 to 95 weight percent polycarbonate; and (ii) 4.9 to 30 weight percent liquid crystal polymer; in the presence of 0.01 to 0.1 weight percent catalyst; wherein the combined weight percent value of all components does not exceed 100 wt. %, and wherein all weight percent values are based on the total weight of the polymer blend; and (b) molding the polymer blend into said article.

Aspect 13. The method of aspect 12, wherein the molding comprises compression molding.

Aspect 14. The method of aspect 12 or 13, wherein the liquid crystal polymer comprises aromatic copolyester resin.

Aspect 15. The method of any one of aspects 12-14, wherein the polycarbonate comprises residues of bisphenol A.

Aspect 16. The method of any one of aspects 12-15, wherein the polycarbonate comprises less than or equal to 33 ppb of molybdenum; less than or equal to 33 ppb of vanadium; less than or equal to 33 ppb of chromium; less than or equal to 75 ppb of titanium; less than or equal to 375 ppb of niobium; less than or equal to 33 ppb of nickel; less than or equal to 10 ppb of zirconium; less than or equal to 10 ppb iron; or any combination of the foregoing.

Aspect 17. The method of any one of aspects 12-16, wherein the polymer additionally comprises one or more additives selected from anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer.

Aspect 18. A method for forming a transparent polymer blend comprising transesterification of (i) 69.9 to 95 weight percent polycarbonate; and (ii) 4.9 to 30 weight percent liquid crystal polymer; in the presence of 0.01 to 0.1 weight percent catalyst; wherein said polymer blend is transparent; wherein the combined weight percent value of all components does not exceed 100 wt. %, and wherein all weight percent values are based on the total weight of the polymer blend.

Aspect 19. The method of aspect 18, wherein the liquid crystal polymer comprises an aromatic copolyester resin.

Aspect 20. The method of aspect 18 or 19, wherein the polycarbonate comprises residues of bisphenol A.

Aspect 21. The method of any one of aspects 18-20, wherein said transesterification is accomplished by a process comprising reactive blending in extruder operating at 50 to 300 rpm, at a temperature of 200 to 300° C. where, optionally, one reactive component is added at an intermediate stage in the transesterification process through side extruder.

Aspect 22. The method of aspect 21, having a mixing time in the extruder of less than or equal to 5 minutes.

Aspect 23. The method of any one of aspects 18-22, wherein the polycarbonate comprises less than or equal to 33 ppb of molybdenum; less than or equal to 33 ppb of vanadium; less than or equal to 33 ppb of chromium; less than or equal to 75 ppb of titanium; less than or equal to 375 ppb of niobium; less than or equal to 33 ppb of nickel; less than or equal to 10 ppb of zirconium; less than or equal to 10 ppb iron; or any combination of the foregoing.

Aspect 24. The method of any one of aspects 18-23, additionally comprising molding the polymer blend into an article.

Aspect 25. An article comprising a transparent polymer blend of any one of aspects 1-11.

EXAMPLES

The invention is illustrated by the following non-limiting examples.

Example 1

A transparent polymer is formed by transesterification of (i) 69.9 to 95 weight percent polycarbonate; and (ii) 4.9 to 30 weight percent Vectra A-950 liquid crystal polymer; in the presence of 0.01 to 0.1 weight sodium stearate percent catalyst.

Example 2

The transparent polymer of Example 1 is formed into a shaped article using compression molding.

Example 3

A transparent polymer is formed by transesterification of (i) 84.9 to 95 weight percent polycarbonate; and (ii) 4.9 to 15 weight percent Vectra A-950 liquid crystal polymer; in the presence of 0.01 to 0.1 weight percent sodium stearate catalyst.

Example 4

The transparent polymer of Example 3 is formed into a shaped article using injection molding.

Definitions

It is to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

As used herein, the term "polymer" includes polymers composed of a single species of a repeating unit ("homopolymer") and polymers composed of a plurality of kinds of repeating units (so-called "copolymer").

As used herein, the term "combination" is inclusive of blends, mixtures, alloys, reaction products, and the like.

Ranges can be expressed herein as from one particular value to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or the same. It is generally understood, as used herein, that it is the nominal value indicated ±5% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

References to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt. %," and "wt. %" of a component, which can be used interchangeably, unless specifically stated to the contrary, are based on the total weight of the polymer blend in which the component is included. For example if a particular element or component in a composition or article is said to have 8% by weight, it is understood that this percentage is relative to a total compositional percentage of 100% by weight.

As used herein, the term "transparent" means that the level of transmittance for a disclosed composition is greater than 50%. In some embodiments, the transmittance can be at least 60%, 70%, 80%, 85%, 90%, or 95%, or any range of transmittance values derived from the above exemplified values. In the definition of "transparent", the term "transmittance" refers to the amount of incident light that passes through a sample measured in accordance with ASTM D1003 at a thickness of 3.2 millimeters.

Unless otherwise stated to the contrary herein, all test standards are the most recent standard in effect at the time of filing this application.

The term "transesterification" is intended to include mechanisms of reaction that can occur between ester, alcohol and acid groups such as ester exchange and condensation reactions.

What is claimed:

1. A transparent polymer blend comprising a polymer derived from transesterification of:
   (i) 69.9 to 95 weight percent polycarbonate; and
   (ii) 4.9 to 30 weight percent liquid crystal polymer,
   in the presence of 0.01 to 0.1 weight percent catalyst, wherein the catalyst comprises a transition metal catalyst comprising at least one of Zn, Ce, Ti, Sn, Al, Co, Sb, or Pb; an alkali metal based compound, or an alkali earth metal based compound,
   wherein said polymer is transparent.

2. The transparent polymer blend of claim 1, comprising 84.9 to 95 weight percent polycarbonate and 4.9 to 15 weight percent liquid crystal polymer.

3. The transparent polymer blend of claim 1, having a transmittance of at least 70% measured in accordance with ASTM D1003.

4. The transparent polymer blend of claim 1, wherein the liquid crystal polymer comprises an aromatic polyester, aromatic polyesteramide or aramid polymer.

5. The transparent polymer blend of claim 1, wherein the liquid crystal polymer comprises at least one of (i) p-hydroxybenzoic acid/6-hydroxy-2-naphthoic acid copolyesters and (ii) p-hydroxybenzoic acid/terephthalic acid/4,4'-biphenol copolyesters.

6. The transparent polymer blend of claim 1, wherein the liquid crystal polymer comprises 2-naphthalenecarboxylic acid, 6-(acetyloxy)-polymer with 4-(acetyloxy)benzoic acid.

7. The transparent polymer blend of claim 1, wherein the liquid crystal polymer is unfilled.

8. The transparent polymer blend of claim 1, wherein the polycarbonate comprises residues of bisphenol A.

9. The transparent polymer blend of claim 1, wherein the polycarbonate comprises less than or equal to 33 ppb of molybdenum; less than or equal to 33 ppb of vanadium; less than or equal to 33 ppb of chromium; less than or equal to 75 ppb of titanium; less than or equal to 375 ppb of niobium; less than or equal to 33 ppb of nickel; less than or equal to 10 ppb of zirconium; less than or equal to 10 ppb iron; or any combination of the foregoing.

10. The transparent polymer blend of claim 1, wherein the polymer additionally comprises one or more of an anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer.

11. An article comprising the transparent polymer blend of claim 1, wherein the article is a component in a portable electronic device or an automobile.

12. A method for forming a transparent polymer blend comprising transesterification of (i) 69.9 to 95 weight percent polycarbonate; and
(ii) 4.9 to 30 weight percent liquid crystal polymer,
in the presence of 0.01 to 0.1 weight percent catalyst, wherein the catalyst comprises a transition metal catalyst comprising at least one of Zn, Ce, Ti, Sn, Al, Co, Sb, or Pb; an alkali metal based compound, or an alkali earth metal based compound,
wherein said polymer blend is transparent.

13. The method of claim 12, wherein the liquid crystal polymer comprises an aromatic copolyester resin.

14. The method of claim 12, wherein said transesterification is accomplished by a process comprising reactive blending in extruder operating at 50 to 300 rpm, at a temperature of between 200 to 300° C.

15. The method of claim 12, additionally comprising molding the polymer blend into an article.

* * * * *